United States Patent

[11] 3,625,895

| [72] | Inventor | Edgar D. Brown<br>Schenectady, N.Y. |
| --- | --- | --- |
| [21] | Appl. No. | 68,594 |
| [22] | Filed | Aug. 31, 1970 |
| [45] | Patented | Dec. 7, 1971 |
| [73] | Assignee | General Electric Company<br>Continuation-in-part of application Ser. No. 862,576, Aug. 15, 1969, which is a division of application Ser. No. 666,948, Sept. 11, 1967, now abandoned, Original application Nov. 3, 1969, Ser. No. 873,511, now Patent No. 3,557,175, which is a continuation-in-part of application Ser. No. 666,948, Sept. 11, 1967, now abandoned. Divided and this application Aug. 31, 1970, Ser. No. 68,594 |

[54] LUBRICANTS CONTAINING HALOGEN-SUBSTITUTED ORGANOSILICON COMPOUNDS
9 Claims, No Drawings

| [52] | U.S. Cl. | 252/49.6 |
| --- | --- | --- |
| [51] | Int. Cl. | C10m 1/52 |
| [50] | Field of Search | 252/49.6 |

[56] References Cited
UNITED STATES PATENTS

| 2,715,113 | 8/1955 | Gordon | 252/49.6 X |
| --- | --- | --- | --- |
| 3,423,318 | 1/1969 | Bauer et al. | 252/49.6 |

*Primary Examiner*—Daniel E. Wyman
*Assistant Examiner*—W. Cannon
*Attorneys*—Donavon L. Favre, Donald J. Voss, Frank L. Neuhauser, Oscar B. Waddell and Joseph B. Forman

ABSTRACT: Lubricating compositions useful for lubricating high-temperature alloys are prepared by adding organosilicon compounds containing silicon-bonded ethyl groups substituted with iodine, with bromine or chlorine, and with alkoxy, acyloxy or hydroxy groups to oils of lubricating viscosity.

LUBRICANTS CONTAINING HALOGEN-SUBSTITUTED ORGANOSILICON COMPOUNDS

CROSS-REFERENCE TO RELATED APPLICATION

This application is a continuation-in-part of copending application Ser. No. 862,576 filed Aug. 15, 1969, which in turn is a division of Ser. No. 666,948, filed Sept. 11, 1967, and now abandoned and, in addition, is a division of copending application Ser. No. 873,511 filed Nov. 3, 1969, now U.S. Pat. No. 3,557,175 issued Jan. 19, 1971 which in turn is a continuation-in-part of application Ser. No. 666,948 filed Sept. 11, 1967 and now abandoned.

BACKGROUND OF THE INVENTION

This invention relates to lubricating compositions containing halogen-substituted organosilicon compounds.

As the requirements of modern technology for surfaces which can operate in adverse environments have become more demanding, the metallurgical arts have provided suitable materials, such as the various stainless steels and high temperature metals and alloys. However, the development of lubricating compositions satisfactory to eliminate friction between relatively moving surfaces composed of such high temperature materials has not kept pace with the development of such materials. While various iodine-substituted compounds are described in the literature for lubricating difficult to lubricate metallic surfaces and while many of these materials do a satisfactory job of lubricating at room temperature, the vast majority of such materials evaporate at a very high rate when exposed to elevated temperatures generated by the environment in which the lubricating surfaces must operate or tend to corrode seriously the surfaces being lubricated and adjacent materials. Thus, these materials have had severe shortcomings which have prevented their use. In my copending application Ser. No. 862,576 assigned to the same assignee as the present invention, there is disclosed a class of organosilicon materials containing silicon-bonded dihalogenoethyl radicals in which the halogeno groups are a mixture of iodine and chlorine or a mixture of iodine and bromine. While these materials are quite useful in performing the lubricating function and quite stable at elevated temperatures and thus find application in lubricating environments, these materials tend to fume when exposed to moist environments, liberating various halogen acids which tend to corrode parts being lubricated.

SUMMARY

The present invention is based on my discovery of lubricants containing a new class of substituted organosilicon compounds which have all of the benefits of the lubricants containing the dihalogenoethyl-substituted organosilicon compounds of my aforementioned copending application and which, in addition, are resistant to fuming and thus do not produce corrosive products upon exposure to atmospheric moisture.

DESCRIPTION OF THE PREFERRED EMBODIMENTS

The lubricants containing halogenated organosilicon compounds of the present invention comprise hydrocarbon and polysiloxane lubricants containing substituted silanes and siloxanes having the average formula:

(1) 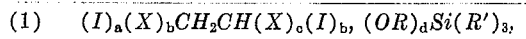

and (2) 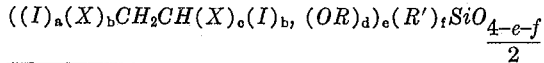

where X is either bromine or chlorine; R is a member selected from the class consisting of hydrogen, lower alkyl radicals, and lower acyl radicals; R' is a member selected from the class consisting of monovalent hydrocarbon radicals free of aliphatic unsaturation and halogenated monovalent hydrocarbon radicals free of aliphatic unsaturation; the sum of $a$ plus $b$ is equal to 1; $a$ has a value of 0.8 to 1.0; $b$ has a value of 0 to 0.2; $c$ is equal to 1 minus $d$ minus $b'$ and has a value of 0.8 to 0.94; $d$ is equal to from 0.06 to 0.16, and preferably to about 0.12; $b'$ has a value of 0 to 0.2; $e$ has a value of from 0.05 to 1.0; $f$ has a value of from 1.00 to 2.00, inclusive, and the sum of $e$ plus $f$ is equal to from about 2.00 to 3.00, inclusive.

The present invention is directed to lubricating compositions comprising an oil of lubricating viscosity together with a small but effective amount to improve lubricating characteristics of one of the halogenated organosilicon compounds of formula (1) or formula (2).

As will be noted from an examination of formulas (1) and (2), the halogenated organosilicon compounds are characterized by the presence of silicon-bonded ethylene groups which, on the average, contain iodine-bonded primarily to the carbon atom beta to silicon with a secondary amount bonded to the carbon atom alpha to the silicon, either bromine or chlorine bonded to both the carbon atom alpha to silicon and the carbon atom beta to silicon and a hydroxy, acyloxy, or alkoxy group attached to the carbon atom alpha to silicon. For brevity, these substituted ethyl groups will often hereinafter be referred to as "halogenated ethyl" radicals. As compared with other compositions, the presence of the hydroxy, acyloxy or alkoxy group tends to improve the hydrolytic stability of the halogenated organosilicon compounds. It is, of course, apparent that both formula (1) and formula (2) represent average compositions since individual molecules of the composition will have whole numbers of various halogen, hydroxy, alkoxy or acyloxy substituents.

In the above formula, R is defined as a member selected from the class consisting of hydrogen, lower alkyl and lower acyloxy radicals. By lower alkyl radicals are meant alkyl radicals containing from about one to seven carbon atoms, such as methyl, ethyl, propyl, butyl, isobutyl, heptyl, etc. radicals. By lower acyl radicals are meant acyl radicals of aliphatic monocarboxylic acid containing from one to seven carbon atoms and include, for example, the acyl radicals derived from formic acid, acetic acid, propionic acid, butyric acid, valeric acid, heptanoic acid, etc. In the preferred embodiment of my invention, R is the acetyl radical.

Included within the monovalent hydrocarbon radicals free of aliphatic unsaturation defined by R' are, for example, alkyl radicals, e.g., methyl, ethyl, propyl, butyl, isobutyl, octyl, octadecyl, etc. radicals, with the preferred alkyl radicals being lower alkyl radicals containing from one to seven carbon atoms, cycloalkyl radicals, e.g., cyclohexyl, cycloheptyl, etc. radicals; aryl radicals, e.g., phenyl, xylyl, tolyl, naphthyl, etc. radicals, with the preferred aryl radicals being monocyclic aryl radicals; aralkyl radicals, e.g., benzyl, phenylethyl, and other phenyl lower alkyl radicals, etc. The preferred specific radicals represented by R' are methyl and phenyl, with the methyl radical being the most preferred.

In a given halogenated organosilicon compound within the scope of formula (1) or formula (2), the various R' groups can be the same or a mixture of different R' groups can be present.

The halogenated organosilicon compounds of formula (2) comprise one or more siloxane units having the formula:

(3) 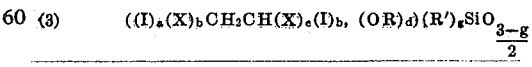

alone or in combination with one or more siloxane units having the formula:

(4) 

where R, R' and X are as previously defined, $g$ is a whole number equal to from 1 to 2 inclusive, $h$ is a whole number equal to from 0 to 3, inclusive, and $a$, $b$, $b'$, $c$ and $d$, and the relationship there between is as previously defined. The proportions of the siloxane units of formula (3) and the siloxane units of formula (4) in the halogenated organosilicon compound are selected so as to provide a total of from 0.05 to 1.0 silicon-bonded halogenated ethyl radicals per silicon atom, from 1.00 to 2.00 R groups per silicon atom, and with a total of from 2.00 to 3.00 halogenated ethyl radicals and R' radicals per silicon atom, all of which are selected to place the halogenated organosilicon compound within the scope of formula (2).

Included within the scope of the silanes of formula (1) can be mentioned those silanes in which the three R' groups are methyl, the three R' groups are phenyl, one of the R' groups is methyl and two are phenyl, or all of the R' groups are ethyl, etc.

The halogenated organosilicon compounds of formula (2) include linear siloxanes, branched chain siloxanes, and cyclopolysiloxanes. These materials are generally liquid but in some cases the products are way or crystalline solids which melt at moderately elevated temperatures. Typical of some of the simpler compositions within the scope of formula (2) are the halogenoethyl-substituted disiloxanes having the formula:

(5) $(Y)(CH_3)_2SiOSi(CH_3)_3$, and (6) $(Y)(CH_3)_2SiOSi(CH_3)_2(Y)$, and the dihalogenoethyl-substituted cyclotetrasiloxane copolymers and homopolymers having the formula:

(7) 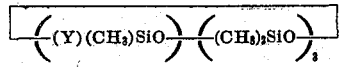

and (8) 

where Y in formulas (5) through (8) represents the halogenated ethyl radical;

(9) $(I)_a(X)_b CH_2CH(X)_c(I)_{b'}(OR)_d$, where X, R, a, b, b', c and d are as previously defined. Other relatively simple types of products within the scope of the present invention are the low viscosity trimethylsilyl chain-stopped diorganosiloxanes in which the diorganosiloxane unit contains one silicon-bonded R' group and one silicon-bonded halogenated ethyl radical of formula (9).

The preparation of the halogenoethyl-substituted silanes and siloxanes of the present invention involves the reaction between an organosilicon compound which is either a silane having the formula:

(10) $CH_2\!=\!CHSi(R')_3$, or a siloxane having the formula:

(11) 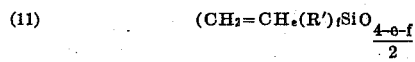

where R', e and f are as previously defined, and a source of the iodine radicals, the bromo or chloro radicals, and the hydroxyl groups, alkoxy groups or acyloxy groups which are found in the radical of formula (9).

The halogen groups which are added to the silicon-bonded vinyl groups of the organosilicon compounds of formula (10) and formula (11) can be provided from a mixture of the appropriate halogens, i.e., a mixture of iodine and bromine or a mixture of iodine and chlorine, or can be provided by the use of the appropriate iodine monohalide, i.e., IBr or ICl. The alkoxy group in the radical of formula (9) is provided either from an alcohol or from a cyclic ether which will decompose in the reaction environment to provide an alkoxy group. The acyloxy radical can be provided directly from the corresponding aliphatic monocarboxylic acid. The hydroxy group is provided from water.

The basic method of preparing the products within the scope of the formula (1) or formula (2) in which R is alkoxy or acyloxy is basically the same and involves the slow mixing of a vinyl-containing silane or siloxane of formula (10) or formula (11) with a solution of the halogen source in the alkoxy or acyloxy source. Whether the initial halogen source is elemental halogen or an iodine monohalide is immaterial for purposes of the present invention since as soon as the elemental halogens are mixed, the iodine monohalide is formed. Thus, when elemental bromine and elemental iodine are mixed, the product is iodine monobromide. When chlorine is bubbled into a solution of iodine in an alcohol or acid, iodine monochloride is formed.

The material supplying the alkoxy or acyloxy group of the radical of formula (9) is conveniently employed in a large excess with respect to the amount present in the final product and thus acts as a solvent both for the halogen source, for the silane or siloxane, and for the reaction products. Thus, while it is apparent from the value of subscript d in the several preceding formulas that only about 0.06 to 0.16 moles of the alkoxy or acyloxy generating material are present per mole of silicon-bonded vinyl groups in the reaction mixture, a large excess of such material is employed, often a several hundred or several thousand fold excess over that theoretically required in the final product. From an examination of the value of subscripts a, b, b' and c of the preceding formulas, it is apparent that the products of the present invention contain slightly less than one silicon-bonded iodine group and one silicon-bonded bromine or chlorine group per silicon-bonded vinyl group in the starting material. While this is the theoretical amount of the halogen-containing material required in the reaction mixture, it is often found that it is advantageous to employ an excess of the halogen-containing material so as to insure complete reaction of all silicon-bonded vinyl groups. However, the reaction can be effected with as little as about stoichiometric amounts of the halogen-generating material, but amounts up to 100 to 1,000 percent excess can be employed. The ratio between the alkoxy or acyloxy-generating material and the iodine-containing material is such that enough of the alkoxy or acyloxy-generating material is present to act as a solvent for the halogen material. Thus, the amount of alkoxy or acyloxy precursor is generally from about five to 20 parts by weight per part by weight of total halogen-generating material.

The source of acyloxy radicals in the compositions of the present invention is the corresponding aliphatic monocarboxylic acid and in the preparation of products within the scope of formulas (1) or (2), the reaction involves the appropriate vinyl-substituted organosilicon compound and a solution of the appropriate halogen materials in the corresponding acid. For the preparation of products within the scope of the present invention in which R is a lower alkyl radical, the source of alkoxy groups for the radical of the compositions of formulas (1) and (2) is the corresponding alcohol or appropriate cyclic ethers. For practical purposes, the appropriate cyclic ethers are selected from the class consisting of tetrahydrofuran and tetrahydropyran. When tetrahydrofuran is employed as the alkoxy-generating material, the R group on the organosilicon compound is the n-butyl group. When the alkoxy-generating material is tetrahydropyran, the corresponding group is the n-amyl group.

An unusual and completely unpredictable feature of the method of preparation of the compositions of the present invention is that wide variations of the proportions of the vinyl-substituted organosilicon compound of formulas (10) or (11) the halogen source, and the alkoxy or acyloxy-generating material results in substantially the same proportion of substituents in the radical of formula (9). The reaction between the halogens and the alkoxy or acyloxy-generating materials and the vinyl-containing organosilicon materials is not readily understood, but apparently there is an equilibrium in the range of from about 0.06 to 0.16 of the alkoxy or acyloxy radicals per alpha carbon atom of the silicon-bonded vinyl groups, with the number of iodine radicals and bromine or chlorine radicals being substantially equal and with substantially all of the iodine radicals being attached to the carbon atom beta to silicon. This means that when the value of d in formula (1) and formula (2) is 0.12 a is equal to 0.94, b and b' are equal to 0.06, and 0 is equal to 0.82. When d is equal to 0.06, a is equal to 0.97, b and b' are equal to 0.03, and c is equal to 0.91. When d is equal to 0.16, a is equal to 0.92 b and b' are equal to 0.08, and o is equal to 0.076. At intermediate values of d, of course, intermediate values of the other subscripts are obtained.

The reaction between the halogen source and the alkoxy or acyloxy source and the vinylorganosilicon compound is an exothermic reaction which proceeds without catalyst. Generally, the rate of addition of the various components of the reaction mixture is selected so as to minimize the temperature rise of the reaction mixture so that a temperature increase of no more than 20° to 25° C. from room temperature is obtained. With such a rate of addition, the time required for completion of the reaction ranges from about 1 hour to 3 hours. The course of the reaction is readily followed by infrared analysis which shows the gradual disappearance of the peaks at 6.25 and 7.1 microns, corresponding to the silicon-bonded vinyl groups in the starting material and by the appearance of peaks corresponding to the alkoxy or acyloxy groups and the several halogen radicals. Upon completion of the reaction, the reaction mixture is stripped of the unreacted alcohol, cyclic ether, or carboxylyic acid employed as a reactant and then treated with a moist mixture of sodium thiosulfate and sodium bicarbonate to neutralize and remove any impurities. This results in one of the products of formula (1) or formula (2) in which R is an alkyl radical or an acyl radical. Since the product is sensitive to ultraviolet, green, and red light, it is often convenient to add stabilizers to the composition in the form of free radical acceptors which adsorb free radicals generated by light-induced decomposition, such as isoprene, d-limonene and α-methylstyrene. Free radical generation can also be minimized by dyes which adsorb light in the above regions, such as Calco Blue and Tinuvin-P, which are commercial light absorbers.

Products within the scope of formula (1) or formula (2) in which R is hydrogen are prepared by first dissolving the halogen source in a halogenated solvent such as carbon tetrachloride, trichloroethylene, perchloroethylene, and the like. The solution of the halogen source in the halogenated solvent is then mixed with the vinyl-containing organosilicon materials of formulas (10) or (11) to produce an intermediate product. The rate of the mixing of the components of the reaction mixture is again adjusted so that the temperature of the reaction mixture rises no more than about 20° to 25° C. above room temperatures, which is accomplished in a reaction time of about 1 to 3 hours, depending upon the thermodynamics of the particular reaction system. The amount of halogenated solvent employed in the reaction mixture can vary within wide limits, depending upon the particular halogenated solvent and the particular halogen source. In general, a satisfactory amount of halogenated solvent is from about 10 to 200 parts per part of the halogen source. The proportions of halogen source to vinyl-containing organosilicon compound is adjusted as before to provide at least the amount of halogen required by the stoichiometry of the reaction, but a large excess of the halogen can be employed without adverse results.

Upon completion of the reaction of the solution of the halogen source in the halogenated solvent with the vinyl-containing organosilicon compound, the reaction mixture is washed with voluminous quantities of water, such as a 10 to 20 volume excess of water. This washing converts the intermediate product to the product within the scope of formulas (1) or (2) in which R is hydrogen. After the washing is completed, water is separated from the reaction mixture by decanting the organic phase from the aqueous phase, the organic phase is then stripped of solvent, and the resulting product is treated with moist sodium thiosulfate and sodium bicarbonate to further purify the product. The final product is then treated with free radical acceptors and with dyes to provide stabilization as before.

The halogenated organosilicon compounds within the scope of formulas (1) and (2) are used as additives for other lubricating materials and even as additives for converting very poor lubricating materials into useful lubricating materials. When the halogenated organosilicon compounds within the scope of formula (1) and formula (2) are used as additives for oils of lubricating viscosity, the oils are used as other lubricants to reduce the friction between solid surfaces which move with respect to each other. The lubricating oils to which the products of formula (1) and formula (2) are added include any type of lubricating oils, ranging from gasoline and kerosene to other common lubricating oil materials. The preferred class of lubricating oils which are the base lubricating fluids in one embodiment of my invention are the hydrocarbon oils and the silicone oils.

Suitable hydrocarbon oils are those occurring naturally in petroleum and particularly are those useful for the lubricating of machinery, e.g., neutral oils having a viscosity of between about 50 S.U.S. at 100° F. and 2,000 S.U.S. at 100° F., or bright stocks having a viscosity between 90 and 300 S.U.S. at 210° F., but any petroleum product which is required to have oiliness in certain uses can be improved in this property by adding the silanes and siloxanes of formula (1) or formula (2). The preferred petroleum hydrocarbons are those boiling above 300° F. and especially preferred are those boiling above 500° F. at atmospheric pressure.

For many of the usual applications of the lubricating compositions of this invention, conventional lubricating oils, cutting oils, metal working oils, hydraulic fluids, pneumatic equipment oils, spindle oils, gear oils, and the like can be used as the base lubricating fluid. It is contemplated in one of the preferred embodiments of my invention that the lubricating oils include straight mineral lubricating oils or distillates derived from paraffinic, naphthenic, asphaltic, or mixed base crudes or, if desired, various blended oils can be employed as well.

The silicone oils which can be used as the base fluid in the compositions of the present invention include those silicones described in U.S. Pat. No. 2,469,888—Patnode, which comprise conventional silicone materials which are commercially available from a number of sources. These organopolysiloxanes are characterized by the general formula:

(12) 

where Z is a member selected from the class consisting of monovalent hydrocarbon radicals and halogenated monovalent hydrocarbon radicals, and $n$ has a value of from about 2,000 to 2.2, inclusive. The radicals represented by Z in formula (12) are the conventional radicals usually associated with silicone materials and include alkyl radicals, e.g., methyl, ethyl, propyl, butyl, octyl, octadecyl, etc. radicals; aryl radicals, e.g., phenyl, naphthyl, tolyl, xylyl, etc. radicals; aralkyl radicals, e.g., benzyl, phenylethyl, etc. radicals; cycloaliphatic radicals, e.g., cyclohexyl, cycloheptyl, etc. radicals; unsaturated aliphatic radicals, e.g., vinyl, allyl, cyclohexenyl, etc. radicals; and halogenated monovalent hydrocarbon radicals, e.g., chloromethyl, chloroethyl, dibromophenyl, alpha,alpha,alpha-trifluoropropyl, etc. radicals. In the preferred embodiment of my invention, the radicals represented by Z are monovalent hydrocarbon radicals free of aliphatic unsaturation and in the preferred specific embodiment of my invention, the radicals are selected from the class consisting of methyl and phenyl, with the preferred radical of this pair being the methyl radical.

In preparing the lubricating compositions of the present invention which contain the substituted organosilicon compounds of formula (1) or formula (2) and a lubricating oil, the organosilicon compound is merely dissolved or dispersed in the lubricating oil to form the desired composition. This solution or dispersion can be effected either before or after materials such as light stabilizers and free radical absorbing agents are added. In general, the amount of the halogenated organosilicon compound of formula (1) or formula (2) which can be added to the lubricating oil varies within wide limits. However, one of the beneficial features of the present invention is that excellent lubricating characteristics are obtained when only small amounts of the organosilicon compound is added. Suitable amounts include, for example, from about 0.01 to 10 parts by weight of the organosilicon compound of formula (1) or formula (2) per 100 parts of the lubricating oil base fluid. In practice, it is found that the solubility of the halogenated organosilicon compounds of the present invention differ with different base oils, so that a person skilled in the art would select an amount of additive no greater than the solubility of such additive in the base oil. Thus, the organopolysiloxanes of formula (2) are highly soluble in silicone base oils by soluble only to an extent of about 7–8 percent by weight in mineral oil. These factors are taken into account in designing the particular lubricating composition to be employed for a given lubricating application.

In addition to the halogenated organosilicon compounds of formula (1) and formula (2) dissolved in the base lubricating fluids, the present invention also contemplates the addition of other additives, such as the wetting agents, fillers, thickeners, and dyes to the base lubricating fluid. In some instances, it is advantageous to add minor amounts, e.g., from about 5 to 20 percent by weight, of mutual solvent for both the organosilicon compound of formula (1) or formula (2) and the base lubricating fluid, where the solubility of the organosilicon compound in the base lubricating oils is limited. The various fillers added to the lubricating compositions are used to obtain greaselike consistency and are generally nonabrasive fillers, such as silica gel, carbon black, diatomaceous earth, graphite, etc.

Compositions comprising the organosilicon compounds of formula (1) or formula (2) and a base lubricating oil can be used to lubricate a plurality of pairs of surfaces which move with respect to each other. These compositions are particularly useful in the lubricating of surfaces which heretofore have been almost impossible to lubricate by conventional methods. Of particular utility is the lubrication of two solid surfaces moving relative to each other when one of the surfaces is a metal which is at least 50 percent titanium. The other surface can be a metal used for fabricating structural shapes, e.g., iron, molybdenum, silver, copper, beryllium, tungsten, magnesium, titanium, zirconium, chromium, nickel, cobalt, aluminum, tin, etc., and various metal compositions, for example, high- and low-temperature alloys of which typical examples are steels, brasses, the various alloys of magnesium, cobalt, nickel, zinc, chromium, zirconium, beryllium, aluminum, iron, etc.

In addition to lubricating surfaces which include titanium, the compositions of the present invention are also useful as extreme pressure-lubricating compositions for pairs of metal surfaces moving relative to each other when neither of the surfaces contains titanium. Thus, these compositions are useful for lubricating any combination of two of the surfaces previously described. The present invention is especially useful for the lubrication of heat-resistant alloys, such as those commercially available under the names of Rene 41, Inconel 718, Monel K. Casteloy C, and Udimet, all of which are nickel-based alloys of published composition.

The amount of lubricating composition within the scope of the present invention used to lubricate moving surfaces can vary within wide limits and are within the skill of those having knowledge of the lubricating art. The amount of lubricant is merely selected to insure that there is a lubricating supply of the lubricant composition between the surfaces which are to be lubricated.

The following examples are illustrative of the preparation of halogenated organosilicon compounds within the scope of formula (1) or formula (2), of the preparation of lubricating compositions by the addition of such halogenated organosilicon compounds to lubricating oils, and of the method of lubricating surfaces with such compositions. These examples are illustrative only and are not intended for purposes of limitation. All parts are by weight.

In the examples will follow, lubricating compositions of the present invention, as well as various prior art and control materials, are evaluated by one or more different methods. One measure of the lubricating characteristics of a material is its wear in the conventional Four Ball Wear test. In the test, as applied in the present invention, three rigidly clamped ½-inch 304 stainless steel balls in a metal cup are covered with the lubricating composition under evaluation. A fourth ball of the same diameter of 304 stainless steel is pressed into contact with the three stationary balls under a load of 30 kg. and rotates at a speed of 600 r.p.m. at ambient temperature for one-half hour. The contact points between the rotatable ball and the three stationary balls grow to circular scars as wear progresses. The average diameter of these scars in millimeters after the one-half hour is taken as a measure of wear. The better the lubricity of the fluid, the lower is the wear scar.

In another test designed to measure extreme pressure-lubricating characteristics of various materials, a minimum seizure load is determined. In particular, this test is run on a Falex lubricant-testing machine which is described in an article by Victor A. Ryan in Lubrication Engineering, Sept. 1946, pages 102 to 104. Essentially, the test performed by the machine involves rotating a shaft between two V-blocks as pressure is applied to the bearing surfaces. A measure of the lubricating characteristics of the lubricant under evaluation is obtained by slowly increasing the pressure applied to the bearing surfaces as described in the article. The pressure at which the bearing surfaces seize the rotating shaft is recorded. The higher the pressure, the better is the material under test as a lubricant. In applying this Falex test, the rotating shaft and the V-blocks were both composed of 302 stainless steel.

In the corrosion test, a carbon-steel coupon is half submerged in the fluid under test in a 2-ounce jar. The 2-ounce jar is placed in a 1-pound (pint) jar with 50 to 100 grams water and the large jar is sealed. Corrosion characteristics of the fluid under test in this moist environment is determined by visual inspection of the carbon-steel sample at the end of 24 hours.

EXAMPLE 1

To a reaction vessel was added 4,000 parts of acetic acid, 1150 parts of elemental iodine, and 720 parts bromine and the reaction mixture was stirred until a uniform solution was obtained. To this solution was slowly added 770 parts of tetramer of methylvinylsiloxane over a 2-hour period while the reaction mixture was kept at a temperature of 20° C. Subsequently, the reaction mixture was allowed to warm to 25° C. over a 1-hour period, and then washed with voluminous amounts of water to remove unreacted acetic acid and other water-soluble products and to produce a viscous, dark-red liquid in an amount of 2,100 parts. This 2,100 parts was dissolved in 730 parts of carbon tetrachloride. The resulting solution was washed with water, dried over sodium sulfate, and the carbon tetrachloride was stripped from the reaction mixture. This resulted in a product within the scope of the present invention having the average formula:

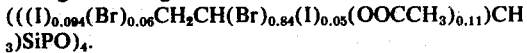

The identity of this product was confirmed by wet analysis and be infrared analysis which showed the peak at 8.2 microns corresponding to the iodine group, a peak at 8.31 microns corresponding to the bromine group, a peak at 5.72 microns corresponding to the acetate radical, and a peak at 9.2 microns corresponding to the cyclotetrasiloxane.

A lubricating composition was prepared by adding one part of the above product to 11 parts of white naphthenic mineral oil and milling the materials on a colloid mill to insure thorough dispersion. Then 0.4 part sodium thiosulfate powder, 0.6 part dry sodium bicarbonate, and 0.006 part of water were added to the mixture in the colloid mill. The reaction mixture then turned water-white and was removed from the mill. At this point, 0.1 part of d-limonene, a free radical acceptor, was added, the resulting product was dried over sodium sulfate and filtered through diatomaceous earth to produce a clear product. To this clear product, 0.001 part Calco blue dye was added to give a light-stable product. This light-stable product was essentially a saturated, stabilized solution of the cyclotetrasiloxane in mineral oil. Chemical analysis of this saturated material showed the presence of 4 percent total halogen as compared with about 58 percent halogen in the cyclotetrasiloxane, and about 5 percent halogen in the mixture of one part of the cyclotetrasiloxane to 11 parts of mineral oil. This product was then diluted to 1 percent halogen with more white mineral oil and subjected to the Four Ball Wear test, to the Falex test, and to the corrosion test. Another sample of the product was diluted with additional mineral oil to a halogen content of 0.1 percent by weight. The three solutions, as well as the control, were subjected to the Four Ball Wear test and the Falex seizure load test. The wear scar of the solution containing 4 percent halogen was 0.49 millimeters. For 1 percent halogen, the scar was 0.58 millimeters. For 1.0 percent halogen, the wear scar was 0.8 millimeters, and for the pure mineral oil, the wear scar was 5.0 millimeters. In the Falex seizure load test, all three of the halogen-containing solutions had a seizure load in excess of 4,500 p.s.i.g. as compared with a load corresponding to 200 p.s.i.g. for the mineral oil containing no additive. In the corrosion test, there was no visible corrosion of the carbon-steel coupon from either of the halogen-containing lubricating compositions. With a control prepared by forming a mixture of 50 percent mineral oil, 45 percent of a commercial mixture consisting of 26.5 percent diphenyl and 73.5 percent diphenyl oxide and 5 percent by weight iodine, severe corrosion was observed. Likewise, with a typical composition of my aforementioned copending application, corrosion was also observed. The mineral oil solution containing 4 percent halogen had a viscosity of 35.5 centistokes at 77° C. and 20.4 centistokes at 100° F. The specific gravity at 25° C. was 0.894 and at 100° C. was 0.851. The material had a refractive index $n_D^{25}$ of 1.4744 and a surface tension at 25° C. of 31.34 dyne centimeters.

EXAMPLE 2

To a reaction vessel was added 300 parts glacial acetic acid and 40 grams bromine were dissolved therein. 63.5 parts iodine were then added and the mixture was stirred until a solution was formed. Over a 2-hour period, 50 parts of vinyltrimethylsilane was slowly added while the reaction mixture was stirred and maintained at a temperature of 20° to 25° C. After the addition of the silane was completed, the resulting product was washed with 1,500 parts water and the aqueous layer of wash water was removed, the resulting material was a dark-red viscous liquid to which was added 3.5 parts of sodium thiosulfate, 3.5 parts of sodium bicarbonate and 0.5 part water. This mixture was thoroughly agitated to produce a water-white solution. The solution was dried with sodium bicarbonate and filtered to remove solvents to produce 120 parts of a silane having the formula:

$((I)_{0.95}(Br)_{0.5}CH_2CH(Br)_{0.87}(I)_{0.04}(OOCCH_3)_{0.09})Si(CH_3)_3$.

The identity of this material was established by chemical analysis which showed the presence of slightly more than 50 weight percent iodine and bromine and by infrared analysis which showed the presence of acetoxy groups, bromine, and iodine with the peaks described earlier. This product was soluble to the extent of about 50 percent in naphthenic mineral oil and a 1 percent solution in mineral oil showed a wear scar of about 0.7 millimeters in the Shell Four Ball Wear test and had a Falex seizure load in excess of 4,500 p.s.i. In the corrosion test, the carbon-steel coupon was unaffected. In the absence of inhibitors and stabilizers, this material took on a pale red color upon exposure to sunlight but worked satisfactorily as a lubricant even after such exposure.

EXAMPLE 3

To a reaction vessel was added 500 parts of glacial acetic acid and 163 parts of iodine monochloride was dissolved therein. Over a 2-hour period, 86 parts of the cyclotetrasiloxane of methylvinylsiloxane was added while the temperature of the reaction mixture was maintained below 30° C. by external cooling. This product was washed with a large excess of water and the washed product was dissolved in 500 parts carbon tetrachloride and then washed again with water. The product was then treated with six parts of sodium bicarbonate and 0.5 parts water and then eight parts of sodium sulfate was added to dry the solution. The dried solution was then filtered through diatomaceous earth and the carbon tetrachloride was flash distilled from the reaction mixture to product 200 parts of a viscous red liquid having the formula:

$(((I)_{0.92}(Cl)_{0.08}(CH_2CH(Cl)_{0.82}(I)_{0.04}(OOCCH_3)_{0.14})(CH_3)(SiO)_4$.

The identity of this material was confirmed by analysis which showed the presence of about 61 percent halogen and about 16 acetoxy groups per 100 silicon atoms. Infrared analysis showed peaks corresponding to the acetoxy group, the iodine, the chlorine and the cyclotetrasiloxane ring. A saturated solution of the above product was prepared by adding 194 parts of the product to 1,700 parts of mineral oil. The product was paint-milled in the presence of 60 parts sodium thiosulfate and 60 parts sodium bicarbonate and five parts water and then dried over sodium sulfate. The dried material was filtered through diatomaceous earth and then through activated carbon and then through diatomaceous earth again to produce a clean dry product containing a sufficient amount of the silane to provide 3.9 percent halogen in the lubricating composition. The composition was then diluted to 1 percent with additional mineral oil and showed a wear scar of less than 0.75 millimeters in the Shell Four Ball test and had a seizure load in excess of 4,500 p.s.i. in the Falex test. The material was found to be noncorrosive in the corrosion test.

EXAMPLE 4

To a reaction vessel was charged 790 parts ethanol and 80 parts bromine. To the resulting solution was added 127 parts iodine and the reaction mixture was stirred until the iodine was thoroughly dissolved. Over a 2-hour period 93 parts of sym-divinyltetramethyldisiloxane was added while the temperature of the reaction mixture was maintained at 75° C. At the end of this time, the reaction mixture was cooled to 40° C. and the unreacted ethanol was subsequently stripped at 80° C., to produce a slightly reddish viscous liquid having the formula:  $((I)_{0.97}(Br)_{0.03}CH_2CH(Br)_{0.92}(OC_2H_5)_{0.06}(I)_{0.02}(CH_3)_2Si)_2O$.

Analysis of this material showed the presence of approximately six ether groups per 100 silicon atoms and about 67 percent total halogen. Infrared analysis showed a peak at 9.0 microns corresponding to the ether linkage and also showed peaks corresponding to the disiloxane, the iodine and the bromine. A lubricating composition was prepared by adding 20 parts of this material to 80 parts of a 100-centistoke dimethyl silicone fluid. The resulting material was a uniform solution having a halogen content of about 13½ percent. A portion of this 13½ percent solution was diluted to 1 percent and both solutions were evaluated in the Four Ball Wear test and showed wear scars of less than 0.8 millimeters.

EXAMPLE 5

To a reaction vessel was added 1,600 parts carbon tetrachloride and 80 parts bromine. Then 127 parts of iodine was added and the mixture was stirred until the iodine went into solution. Over a 3 hour period, 86 parts of the cyclic tetramer of methylvinylsiloxane was added to the reaction mixture while the temperature was maintained at 20° C. The reaction mixture was then warmed to 25° C. and then washed repeatedly with a large excess of water. Water was then separated from the reaction mixture and the aqueous phase was separated from the reaction mixture and the organic phase was treated with two parts sodium thiosulfate and three parts sodium bicarbonate to convert the originally red liquid to a water-white liquid. The resulting material was dried over sodium sulfate, filtered through diatomaceous earth, and carbon tetrachloride was stripped from the reaction mixture at 50 millimeters pressure and a maximum temperature of 50° C. This resulted in a product having the formula:

$(((I)_{0.94}(Br)_{0.06}CH_2CH(Br)_{0.84}(I)_{0.05}(OH)_{0.11}) (CH_3)SiO)_4$.

The identity of this material was confirmed by analysis which showed the presence of approximately 12 hydroxyl groups per 100 silicon atoms and about 68 percent total halogen. Infrared analysis showed a band at 2.75 microns corresponding to the carbonol group and the bands previously mentioned corresponding to iodine, bromine, and the cyclotetrasiloxane ring. A lubricating composition 200 prepared by adding 200 parts of the above cyclotetrasiloxane to 2,700 parts of white mineral oil and 30 parts of d-limonene and milling the material to a uniform product in a colloid mill. At this time, 9 parts of sodium thiosulfate, 10 parts of sodium bicarbonate, and one part water was added and the material was further milled. The milled material was then dried by mixing with 10 parts sodium sulfate and filtered to produce a lubricating composition which showed 4.1 percent total halogen on analysis. To this material was added 0.01 part Calco blue dye as a light stabilizer. A portion of this material was diluted to a 1 percent halogen level with additional mineral oil and showed a wear scar of less than 0.8 millimeters in the Four Ball test, seizure load in excess of 4,500 p.s.i., and was not corrosive.

While the foregoing examples have illustrated many of the embodiments of my invention, it is understood that my invention is directed broadly to organosilicon compounds containing a silicon-bonded ethyl group which contains a major amount of iodine and the beta carbon atoms and a minor amount of iodine on the alpha carbon atom, bromine or chlorine on both the alpha and beta carbon atoms, and an acyloxy, alkoxy or hydroxy group attached to the alpha carbon atoms, with the average molecule having the average formulas set forth above.

What I claim is:

1. A lubricating oil composition comprising (A) lubricating amounts of a lubricating oil selected from the class consisting of hydrocarbon oils and silicone oils of lubricating viscosity and (B) a small but effective amount to improve lubricating characteristics of a composition having a formula selected from the class consisting of:

$$(I)_a(X)_b CH_2 CH(X)_c(I)_{b'} (OR)_d Si(R')_3$$

and $$((I)_a(X)_b CH_2 CH(X)_c(I)_{b'} (OR)_d (R')_f SiO_{\frac{4-e-f}{2}}$$

where X is either bromine or chlorine; R is a member selected from the class consisting of hydrogen, lower alkyl radicals and lower acyl radicals, R' is a monovalent hydrocarbon radical free of aliphatic unsaturation, the sum of $a$ plus $b$ is equal to 1; $a$ has a value of 0.8 to 1.0; $b$ has a value of 0 to 0.2; $c$ is equal to 1 minus $d$ minus $b'$ and has a value of 0.8 to 0.94; $d$ is equal to from 0.06 to 0.16, and preferably to about 0.12; $b'$ has a value of about 0 to 0.2; $e$ has a value of from 0.05 to 1.0; $f$ has a value of from 1.00 to 2.00, inclusive, and the sum of $e$ plus $f$ is equal to from about 2.00 to 3.00, inclusive.

2. The composition of claim 1 further characterized by the additive of part (B) of claim 1 being a silane.

3. The composition of claim 1 further characterized by the additive of part (B) of claim 1 being a siloxane.

4. The composition of claim 1 further characterized by the additive of part (B) of claim 1 wherein R is hydrogen.

5. The composition of claim 1 further characterized by R being a lower alkyl radical.

6. The composition of claim 1 further characterized by R being a lower acyl radical.

7. The composition of claim 1 further characterized by X being bromine.

8. The composition of claim 1 further characterized by the lubricating oil being a hydrocarbon oil.

9. The composition of claim 1 further characterized by the lubricating oil being silicone oil.

* * * * *